(12) United States Patent
Bolton et al.

(10) Patent No.: US 9,026,790 B2
(45) Date of Patent: *May 5, 2015

(54) PROCESSING PACKET STREAMS

(75) Inventors: Martin Bolton, Blagdon (GB); Paul Pearson, Bristol (GB); Diarmuid Emslie, Bristol (GB)

(73) Assignee: STMicroelectronics (Research & Development) Limited, Marlow Bucks (GB)

( * ) Notice: Subject to any disclaimer, the term of this patent is extended or adjusted under 35 U.S.C. 154(b) by 955 days.

This patent is subject to a terminal disclaimer.

(21) Appl. No.: 12/650,215

(22) Filed: Dec. 30, 2009

(65) Prior Publication Data

US 2010/0180114 A1    Jul. 15, 2010

(30) Foreign Application Priority Data

Dec. 31, 2008 (GB) .................................. 0823702.6

(51) Int. Cl.
*H04L 29/06* (2006.01)
*H04N 21/4385* (2011.01)
*H04N 21/2389* (2011.01)
*H04N 21/434* (2011.01)

(52) U.S. Cl.
CPC ....... *H04N 21/4385* (2013.01); *H04N 21/2389* (2013.01); *H04N 21/434* (2013.01); *H04N 21/43853* (2013.01)

(58) Field of Classification Search
USPC .................. 713/160, 189; 726/22; 375/240.1, 375/240.26, 240.28
See application file for complete search history.

(56) References Cited

U.S. PATENT DOCUMENTS 6,711,683 B1 * 3/2004 Laczko et al. ................ 713/189

(Continued)

FOREIGN PATENT DOCUMENTS

EP    0 893 921 A1    1/1999
EP    0893921         1/1999

(Continued)

OTHER PUBLICATIONS

Image and Video Processing Using MAJC 5200, Sudharsanan et al, IEEE 2000.*

(Continued)

*Primary Examiner* — Luu Pham
*Assistant Examiner* — Jahangir Kabir
(74) *Attorney, Agent, or Firm* — Allen, Dyer, Doppelt, Milbrath & Gilchrist, P.A.

(57) ABSTRACT

A system for processing packet streams includes a first packet queuing circuitry connected between a first processor and a second processor and operable to queue packets for transfer from the first processor to the second processor. The system includes a second packet queuing circuitry connected between the first processor and the second processor and operable to queue packets for transfer from the second processor to the first processor. The first processor is programmed to transfer secure packets to the second processor via the first queuing circuitry for security processing and the second processor is programmed to return the security-processed packets to the first processor via the second queuing circuitry.

37 Claims, 6 Drawing Sheets

(56) References Cited

U.S. PATENT DOCUMENTS

| | | | |
|---|---|---|---|
| 7,334,132 B1 | 2/2008 | Kumar et al. | |
| 7,392,399 B2* | 6/2008 | Grohoski et al. | 713/189 |
| 7,900,022 B2* | 3/2011 | Feghali et al. | 712/36 |
| 8,020,006 B2* | 9/2011 | Leung, Jr. | 713/189 |
| 2002/0106018 A1* | 8/2002 | D'Luna et al. | 375/240.01 |
| 2004/0228414 A1 | 11/2004 | Keck et al. | |
| 2004/0230813 A1 | 11/2004 | Check et al. | |
| 2006/0227967 A1* | 10/2006 | Nishikawa | 380/42 |
| 2007/0140284 A1 | 6/2007 | Blankenship et al. | |
| 2007/0192547 A1* | 8/2007 | Feghali et al. | 711/154 |

FOREIGN PATENT DOCUMENTS

| | | |
|---|---|---|
| EP | 1 286 549 A2 | 2/2003 |
| EP | 1286549 | 2/2003 |
| EP | 1 365 560 A1 | 11/2003 |
| EP | 1365560 | 11/2003 |
| EP | 1 657 912 A2 | 5/2006 |
| EP | 1657912 | 5/2006 |
| WO | 01/05089 | 1/2001 |
| WO | WO 01/37548 A2 | 5/2001 |
| WO | 02/11368 | 2/2002 |
| WO | 2004/099971 | 11/2004 |

OTHER PUBLICATIONS

A Pipelining Approach to Operating Modular Software Defined Radio, Berthold et al, IEEE 20004.*

European Search Report dated Dec. 22, 2011 in connection with European Patent Application No. EP 09 17 9044.

T.R. Hurley, "Evolution of the Digital Set Top Box", Sony United Kingdom Ltd., UK, International Broadcasting Covention, Sep. 12-16, 1996, 6 pages.

R.E. Anderson, et al., "Design of an MPEG-2 transport demultiplexor core", IBM J. Res. Develop., vol. 43, No. 4, Jul. 1999, p. 521-532.

C. Hanna, et al., "Demultiplexer IC for MPEG2 Transport Streams", Jun. 7, 1995, 2 pages.

Anderson et al., "Design of an MPEG-2 Transport Demultiplexor Core," IBM Journal of Research and Development, International Business Machines Corporation, vol. 43., No. 4, Jul. 1999, pp. 521-532.

Hanna et al., "Demultiplexer IC for MPEG2 Transport Streams," IEEE, International Conference on Consumer Electronics—Digest of Technical Papers, Jun. 7, 1995, pp. 252-253.

Hurley, "Evolution of the Digital Set Top Box," International Broadcasting Convention, IEEE, Conference Publication No. 428, Sep. 1996, pp. 277-282.

* cited by examiner

PROCESSING PACKET STREAMS

CROSS-REFERENCE TO RELATED APPLICATIONS

The present application is related to United Kingdom Patent Application No. 0823702.6, filed Dec. 31, 2008, entitled "PROCESSING PACKET STREAMS". United Kingdom Patent Application No. 0823702.6 is assigned to the assignee of the present application and is hereby incorporated by reference into the present disclosure as if fully set forth herein. The present application hereby claims priority under 35 U.S.C. §119(a) to United Kingdom Patent Application No. 0823702.6.

TECHNICAL FIELD

The present invention relates to the processing of packet streams, including security processing.

BACKGROUND

In the transmission of data such as audio or video data, it is known to arrange the data into packet streams.

This means that firstly, the data is divided into discrete packets of a predetermined format, each packet comprising a header and a payload. The header may contain various types of control data including at least a packet identifier. The payload then contains the actual information content, i.e. the information such as the audio or video data that the end-user wishes to consume, sometimes also referred to as "user data". The payload may be encoded for compression purposes and encrypted for security, such that the user data is typically not transmitted in its "raw" form. The packet may also comprise redundant information in the form of error correction codes for use in error correction at the receive side.

Secondly, the fact that the packets are part of a stream means that they have a certain sequential order and real-time requirement relating to their information content. Although a stream may be stored for later consumption, and/or its order or timing requirements need not necessarily be maintained during processing prior to consumption, when the stream is ultimately output to the user for consumption then the order and real-time requirements must be respected (at least on a practical level to a degree that is unnoticeable or tolerable to the user).

One technique for transmitting streams is to multiplex a plurality of streams into a combined stream known as a "transport stream". An example application of this technique is shown schematically in FIG. 1, which shows a digital television transmitter 100 broadcasting digital media to a plurality of receiving user terminals 102. The transmitter 100 could for example be a satellite transmitter for transmitting wireless, digital transport stream signals via a network of one or more satellites; or a terrestrial television transmitter for transmitting wireless, digital transport stream signals via a network of one or more land-based repeater stations. A user terminal 102 could for example be a television set with and integrated digital receiver, a set-top box connected to a television set, a digital radio, or a portable terminal equipped with an appropriate receiver.

Figure 1:
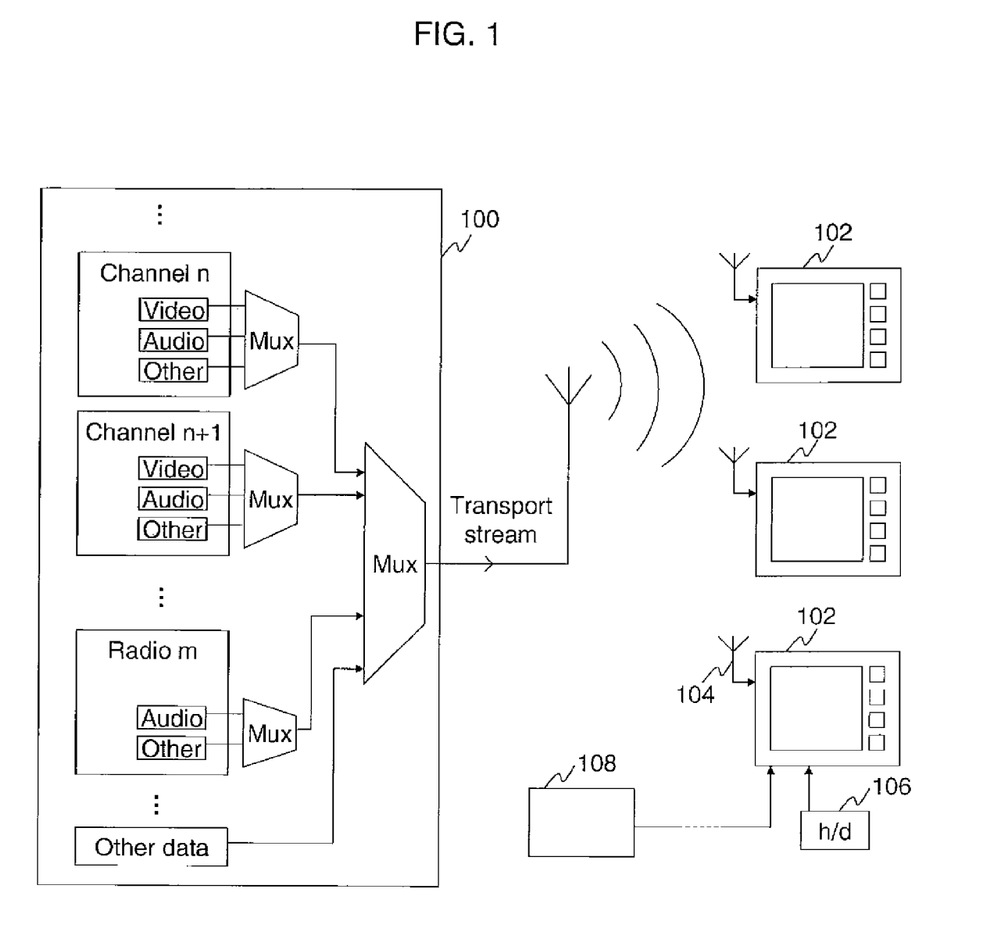
FIG. 1 is a schematic block diagram of a media communication network.

The transmitter 100 is to broadcast the content of a plurality of different concurrent television channels. In the terminology of transport streaming, a group of related streams intended for simultaneous consumption by the same user are together referred to as a program. For example, the output content of a television channel n may comprise a program in the form of a video stream, one or more audio streams (e.g. two in the case of stereo), and another data stream comprising other related data such as text summarising the program or data for use in an interactive service. In the terminology of transport streaming, each of these streams individually may be referred to as an "elementary stream", which in packetised form comprises a plurality of "elementary packets". That is, an elementary stream is a non-multiplexed stream of a single media type and single program.

The transmitter 100 may also broadcast the content of a radio station (i.e. pure audio content without video). For example, the output content of a radio station m may comprises a radio program in the form of one or more audio streams and another data stream providing program information.

The transmitter 100 may also transmit a separate data stream of other non-audio/video data not specifically related to any one particular channel or station, such as text providing program listings, or general interactive content.

At the transmitter 100, the audio, video and/or other data streams of each program are multiplexed together into a respective transport stream. Those transport streams are then multiplexed together into a combined transport stream for transmission. There is not necessarily a one-to-one relation between the elementary packets and the packets of the transport streams; i.e. the elementary streams may be repackaged, typically from longer, variable length elementary packets into shorter, fixed length transport packets. The multiplexing is then typically by time-division multiplexing such that transport packets are interleaved with one another in time.

To aid in selecting and handling the streams of the required program at the receivers 102, some control information is included in the transport stream by the transmitter 100. The transport packets of a program each comprise synchronisation information, typically in the form of a synchronisation byte. For example, the synchronisation bytes of a television program inform the receiver 102 how the audio streams are aligned in time with one another and with the corresponding video stream of that same program, allowing the audio and corresponding video to be synchronised at the receiver 102. Each transport packet also includes a Packet ID (PID) to identify the elementary stream from which it was derived. The transport stream then includes a Program Map Table (PMT) which maps together the PIDs of corresponding audio, video and data streams to their respective programs, i.e. identifies which streams are part of which programs.

Some receivers 102 may be arranged to receive multiple transport streams. For example, in addition to being able to receive a transport stream broadcast from the transmitter 100, a receiver 102 may also be able to retrieve stored transport streams from a hard drive 106, or transport streams via a wired connection to another source 108 such as a cable television provider or the Internet.

In addition to the above, it is also necessary to perform security operations as part of the transmit and receive processing of the transport streams. For example, this may involve encrypting the streams prior to transmission and decrypting them again at the receiver, so as to prevent unauthorised users exploiting the transmission.

Security operations can be implemented in dedicated hardware at the receiver 102. However, this has the disadvantage of being inflexible, since the security cannot be altered or updated without an expensive and time-consuming redesign and remanufacture of the receiver. Alternatively, the security operations can be implemented in software executed on the receiver's processor (typically in the form of firmware). However, although this software option allows more flexibility, it also has its own disadvantages over the hardware option. Firstly, the software security processing incurs additional machine cycles and thus may interfere with other packet processing operations being performed by the processor such as de-multiplexing, error correction, etc. This may be particularly problematic in the case of streaming, where the increased processing cost incurred may slow the processor down and unduly interfere with the real-time requirements of the streams. Secondly, if security is implemented in software then the security algorithms may be vulnerable to hacking, and so there is an increased risk of security being compromised.

It would be advantageous to allow security processing to be performed in software on a processor, but at the same time reduce the perturbance this has on other packet processing operations due to the increased processing cost incurred by the security processing. It would also be advantageous to reduce the security risk incurred by performing security processing in software.

SUMMARY

According to one aspect of the present invention, there is provided system for processing packet streams, the system comprising: a system data-bus for transferring packets of data; a system memory connected to the data-bus for storing packets; a first processor connected to the data-bus, arranged to receive an input stream comprising secure packets; a second processor connected to the data-bus, programmed to perform security processing by applying one or more security algorithms to the secure packets to generate at least partially security-processed packets; and first packet queuing circuitry connected between the first processor and the second processor, separate from said data-bus and memory, operable to queue packets for transfer from the first processor to the second processor; and second packet queuing circuitry connected between the first processor and the second processor, separate from said data-bus and memory, operable to queue packets for transfer from the second processor to the first processor; wherein the first processor is programmed to transfer the secure packets to the second processor via the first queuing circuitry for said security processing; the second processor is programmed to return the security-processed packets to the first processor via said second queuing circuitry; and the first processor is programmed to further process the security-processed packets, other than by applying a security algorithm, to generate output data for output to a user output apparatus.

The present invention thus provides a flexible, programmable packet-processing architecture whilst maintaining security and performance. By providing a second processor for security operations, separate from the first processor used for other packet processing operations, this advantageously reduces the processing load on the first processor caused by the requirement for security processing. At the same time, the provision of dedicated, hardware queues between the first and second processors ensures that packets need not be communicated between the two processors by reading and writing them to system memory via the system data bus, which would put an undesirable load on the system memory and take an undesirable amount of time in memory accesses and bus arbitration. Moreover, since the packets need not pass through system memory during security operations, then the system is less vulnerable to hacking. That is, the provision of a separate security processor in conjunction with hardware queues allows the security operations to be handled in isolation from the rest of the system.

Preferably, the first queuing circuitry comprises a first-in-first-out buffer connected in a first direction to queue packets for transfer from the first processor to the second processor, and the second queuing circuitry comprises a first-in-first-out buffer connected in a second direction to queue packets for transfer from the second processor to the first processor.

In a particularly advantageous embodiment, the first processor is programmed so as to control each of the following operations to be performed substantially concurrently:

(i) retrieval of a secure packet from the system memory via said data-bus, the retrieval involving a delay whilst the read completes in which the first processor is unoccupied in the retrieval and can begin another operation;

(ii) security processing of a previously retrieved packet by the second processor, the security processing involving a delay whilst the first processor awaits the return of a security-processed packet from the second processor and can begin another operation;

(iii) processing a previously security-processed packet by the first processor to generate a corresponding output data; and (iv) writing a previously generated output data to the system memory via said data-bus, the writing involving a delay whilst the write completes in which the first processor is unoccupied in the writing and can begin another operation.

This method of parallel pipelining maximises parallelism in the packet processing, taking full advantage of delays in, for example, accessing packets from system memory, or the delay associated with the security processing by the second processor. By de-coupling the packet processing tasks from the data movement in the system, maximum use is made of the available processor cycles. Thus this method is fast and makes efficient use of the available resources.

According to another aspect of the present invention, there is provided method of processing packet streams, the method comprising: at a first processor connected to a second processor and system memory via a data-bus, receiving an input stream comprising secure packets; using first packet queuing circuitry connected between the first processor and the second processor, separate from said data-bus and memory, to queue the secure packets for transfer from the first processor to the second processor; at the second processor, executing code to perform security processing by applying one or more security algorithms to the secure packets received via said first queuing circuitry to generate at least partially security-processed packets; using second packet queuing circuitry connected between the first processor and the second processor, separate from said data-bus and memory, to queue the security-processed packets for transfer from the second processor to the first processor; and executing code on the first processor to further process the security-processed packets received via the second queuing circuitry, other than by applying a security algorithm, to generate output data for output to a user output apparatus.

According to further aspects of the invention, there are provided a set-top-box, a television, and a television tuner and demodulator device.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 2:
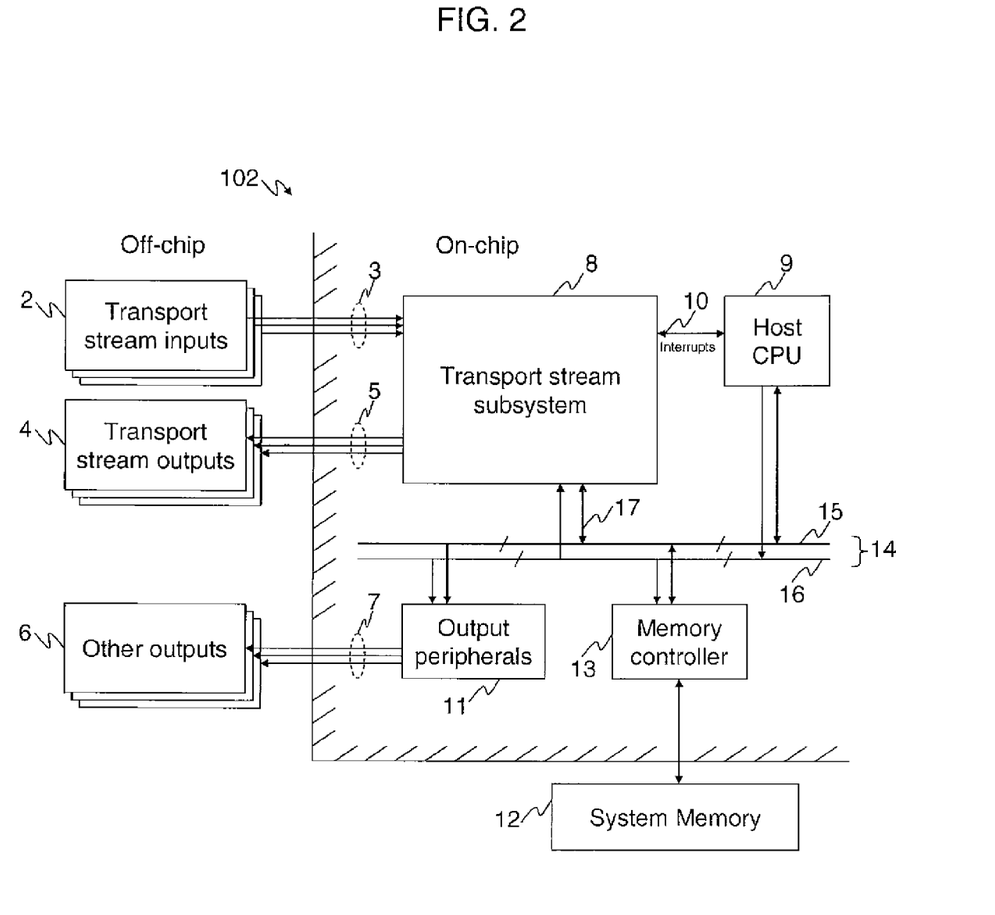
FIG. 2 is a schematic block diagram of a receiver system for processing streams received over the communication network.

FIG. 2 shows a schematic block diagram of a receiver system such as user terminal 102 for receiving and processing transport streams. The system has a chip comprising a transport stream subsystem 8, a host CPU 9, a system memory controller 13, one or more output peripherals 11, and an on-chip bus network 14 comprising a data bus 15 and a configuration bus 16. The transport stream subsystem 8, host CPU 9, system memory controller 13, and output peripherals 11 are all coupled to one another by a connection to the data-bus 15, including by a transport subsystem bus interface 17 connecting the transport stream subsystem 8 to the data bus 15. Each of the transport stream subsystem 8, memory controller 13 and output peripherals 11 is also coupled to the host CPU 9 via the configuration bus 16. Further, the transport stream subsystem 8 is connected to the host CPU 9 via one or more interrupt lines 10. The memory controller 13 is connected to an off-chip system memory 12 such as an SRAM or other RAM (although potentially an on-chip system memory 12 could be used, connected directly to the data-bus 15).

The chip comprises further external, off-chip connections. These may include transport stream input connections 3, transport stream output connections 5, and other output connections 7. The on-chip transport stream subsystem 8 is connected to one or more transport stream input devices via the transport stream input connections 3, and is thus arranged to receive one or more input transport streams 2 originating from off-chip. The input device could for example be a satellite, terrestrial or cable tuner and demodulator device; a hard drive storing one or more transport streams; or a modem for receiving streams from the Internet. The on-chip transport stream subsystem 8 may also be connected to one or more transport stream output devices via the transport stream output connections 5, and thus arranged to supply one or more output transport streams 4 off-chip. For example, the transport stream output device could be an IEEE 1394 link layer device for sending the transport stream onto an IEEE 1394 network. Further, the output peripherals 11 may be connected to one or more output devices via the other output connections 7, and thus arranged to supply data off-chip in other forms such as in decoded form having been decoded by on-chip decoders, or as encapsulated transport packets for off-chip storage or supply to an Ethernet or USB network. Whatever the form or intermediate destination of the output, the ultimate use is for supply of the media content to one or more output devices such as a television screen and loudspeakers of the receiving user terminal 102, via which the user consumes the video and audio media.

In operation, the host CPU 9 runs drivers which control various components of the system such as the transport stream subsystem 8, system memory 12, and peripherals 11 via the configuration bus 16. The host CPU 9 may also receive interrupts from these components informing it of events occurring thereat, and the control by the driver software may operate in dependence on such interrupts. For example, the transport stream subsystem 8 may send interrupts to the host CPU 9 via the interrupt line 10.

Under overall control of the host CPU 9, the transport stream subsystem 8 receives one or more of the input transport streams 2 from an external device (or potentially from an on-chip source such as on-chip storage). These are live transport streams, meaning they have strict real-time requirements. The input transport streams 2 are also encrypted. Then, as discussed in more detail in relation to FIG. 3, the transport stream subsystem 8 operates in conjunction with the system memory 12 via the data bus 15 to filter (i.e. de-multiplex) the transport packets of the required program or programs, perform security processing to decrypt the packets, and perform any other required processing such as error correction and/or extracting the elementary stream data from the transport packets. The transport stream subsystem 8 then outputs a transport stream comprising the processed packets of the de-multiplexed program via transport stream outputs 5, or transfers the extracted elementary streams across the data bus 15 for output via peripherals 11.

Figure 3:
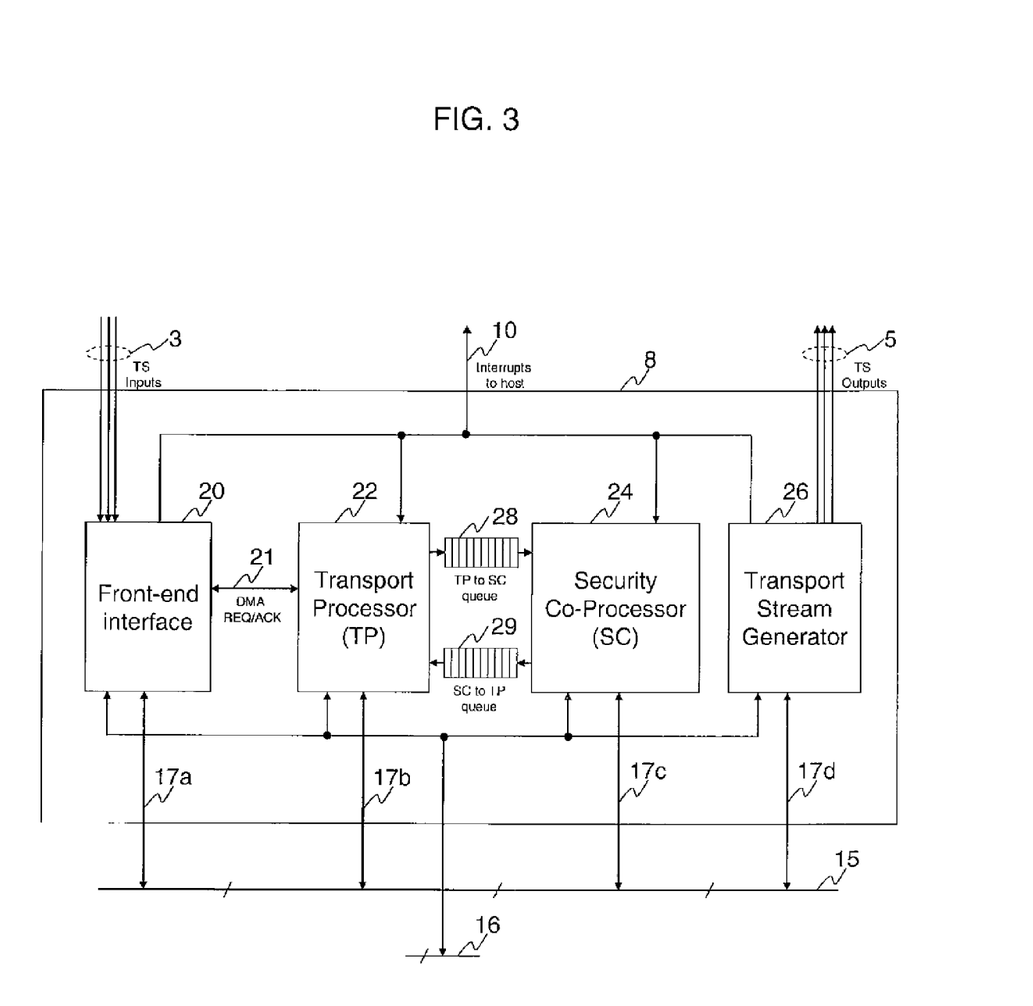
FIG. 3 is a schematic block diagram of a transport stream subsystem for use in a receiver system.

As shown schematically in FIG. 3, the transport stream subsystem comprises a front-end interface 20, a transport processor (TP) 22, a security co-processor (SC) 24, and a transport stream generator 26. Each of the transport processor 22 and security co-processor 24 comprises a central processing unit (CPU) for executing software (or more specifically firmware); but the front-end 20 and transport stream generator are preferably dedicated hardware blocks, without a CPU, which do not execute software to perform their respective functions. The front-end interface 20 is connected to the transport stream input connections 3, and the transport stream generator 26 is connected to the transport stream outputs 5. Each of the front-end interface 20, transport processor 22, security co-processor 24 and transport stream generator 26 is connected to the data bus 15 via a respective bus interface 17a, 17b, 17c and 17d, thus coupling them to the system memory 12. Each of the front-end interface 20, transport processor 22, security co-processor 24 and transport stream generator 26 comprises a direct memory access (DMA) engine for reading and writing data to the system memory 12 via the bus 15. Each of the front-end interface 20, transport processor 22, security co-processor 24 and transport stream generator 26 is also connected to the configuration bus 16 and to the interrupt line or lines 10, thus coupling them to the host CPU 9. The front-end interface 20 is connected to the transport processor 22 via a DMA request and acknowledge interface (DMA REQ/ACK) 21.

Furthermore, in order to facilitate the transfer of packets directly between the transport processor 22 and the security co-processor 24, the transport stream subsystem additionally comprises two hardware packet queues in the form of first-in, first-out (FIFO) buffers 28 and 29. The first of the FIFOs 28 is connected in a first direction, from the transport processor (TP) 22 to the security co-processor (SC) 24. This first FIFO 28 may also be referred to herein as the TP to SC queue. The second of the FIFOs 29 is then connected in a second, opposite direction, from the security co-processor (SC) 24 to the transport processor (TP) 22. This second FIFO 29 may also be referred to herein as the SC to TP queue.

Note that each of these FIFO queues 28 and 29 is a separate, dedicated link for queuing and transferring packets between the two processors 22 and 24: they are separate from the data bus 15 and system memory 12, or any other such system-wide bus and/or memory, which in contrast are general purpose components that also allow transfer of packets or other data to or from other components of the system. The queues 28 and 29 are arranged to allow transfer of packets between only the transport processor 22 and security co-processor 24. Further, the system memory 12 is randomly accessible in that it allows access to an addressed choice of different locations within that memory, and similarly the data bus 15 allows access to an addressed choice of different destinations; whereas in contrast each queue 28 and is constrained to operate in a first-in-first-out mode of operation, and provides only a single route from one fixed source to one fixed destination. A FIFO may comprise a shift register of a certain width, or for larger sizes of FIFO more likely a storage unit plus a set of read and write pointers. However, even in the latter case with the storage being a RAM, the FIFO still differs from the system memory RAM 12 in that it is still constrained by the pointers to the first-in-first-out operation and from an external point of view is not randomly accessible.

In operation, the front-end 20 receives and captures one or more input transport streams 2 via the input connections 3. As mentioned, these are live, real-time streams, typically comprising time-division multiplexed media content such as audio and video from a plurality of different programs. The input transport streams 2 may also be encrypted for security reasons. Most generally, the term encryption as used herein refers to any transformation of data to make it unintelligible to anyone except those knowing some special information, often referred to as the key. For example, the encryption could comprise scrambling.

After capturing the input streams, a second function of the front-end 20 is, where possible, to pre-filter the transport packets in order to discard those of any unwanted programs prior to processing by the transport processor (which amounts to de-multiplexing the desired program or programs from the transport stream). The front-end 20 does this by examining the packet IDs (PIDs) of the incoming transport packets and then discarding those which, on that basis, it can identify as not containing any information content relevant to the desired program. For example, the front end 20 may extract the PID value from the packet header and look it up in a table in system memory 12 via the bus interface 17a. In that case, if the PID look-up indicates that the packet is wanted then it writes that packet to system memory 12 using its DMA engine, but otherwise it discards the packet.

Through this hardware pre-filtering and buffering of live packets into system memory 12 prior to processing, the front-end 20 thus separates and decouples the live, real-time packet capture from the processor intensive and potentially variable length operations of the transport packet processing. This advantageously reduces the processing load in the transport processor 22, and in doing so reduces the real-time processing constraints, the criticality of the packet processing, and the chance of losing packets.

Note though that the front-end 20 cannot necessarily handle all filtering, and some filtering may still need to be left for the transport processor 22. The encryption of an input transport stream 2 may be packet based or block based. Where packet based, this means the encryption is on a packet-by-packet basis such that only the payload of each transport packet is encrypted and not the header, and therefore that the header of each individual transport packet can be read without decryption. In that case, the front-end 20 can filter out unwanted transport packets by examining the Packet ID (PID) in the packet header. However, where the encryption is block based, this means that multiple transport packets are encrypted together into a block, with both the payload and the headers of those packets being encrypted. In that case, only a block header of the overall block is readable without decryption, and so the front-end 20 cannot pre-filter the transport packets. Instead, the whole block, which may potentially include unwanted packets, must be processed by the security co-processor 24 and then any unwanted packets filtered by the transport processor 22 (see below).

Further, note that the payload of some transport packets may comprise a plurality of smaller data objects, referred to as "private table sections" or simply "sections". In some cases, the required content may be included in only one or some sections of a packet. The front-end 20 will not analyse the payload of a packet, and therefore the filtering of unwanted sections must instead be done by the transport processor 22.

In any case, the pre-filtered transport stream (filtered to the extent possible) is written by the DMA engine of the front-end 20 into a buffer data-structure in the system memory 12, via the bus interface 17a and data bus 15. The front-end 20 is preferably arranged to handle multiple independent live stream sources 2, in which case it writes the pre-filtered streams into separate respective buffers in the system memory 12.

The front-end 20 may also generate interrupts to the host 9 via the interrupt line 10 in order to indicate buffer status and error conditions. The front-end 20 may also add a timestamp tag to the packet from the current value of a counter.

The next stage depends on whether the buffered stream is packet-based encrypted or block-based encrypted. If packet based, the individual headers of the transport packets are unencrypted and the transport processor 22 can begin to retrieve those packets from system memory 12 immediately. However, if block based, multiple transport packets including their headers are encrypted together into larger blocks, and the blocks must be security processed to extract individual transport packets before the transport processor 22 can use them. Therefore in the block-based case, the host 9 writes block-related commands into system memory 12 via the data bus 15, and then sets a mailbox which signals for the security co-processor 24 to look for those commands. The security co-processor 24 then executes code which operates it to read the block-related commands and the blocks themselves from the system memory 12, via the bus interface 17c and data bus 15, and then perform the required security processing to extract the individual transport packets with at least unencrypted headers. The executed code then operates the security co-processor 24 to write the transport packets back to a buffer in system memory 12, again via the bus interface 17c and data bus 15. These extracted packets could be completely decrypted, but for preferred security at this stage could instead be written back as independently encrypted transport packets with encrypted payloads and only the headers being unencrypted.

The front-end 20 communicates the presence of packets in a system memory buffer to the transport processor 22 via the DMA REQ/ACK interface 21. The front-end 20 asserts the relevant request line of the REQ/ACK interface 21 when packets are available in the system memory buffer, and the transport processor 22 acknowledges via the REQ/ACK interface 21 when it begins processing the packets. This processing is achieved by executing code on the transport processor 22 which operates it as follows.

Upon detecting the relevant signal on the REQ/ACK interface 21, the transport processor 22 begins to retrieve the packets of a buffered transport stream from the system memory 12, which it does using its DMA engine via the bus interface 17*b* and data bus 15. In the case of multiple buffered streams, this could be from any desired stream or multiple streams.

Having begun to retrieve packets, the first task of the transport processor 22 is to examine their headers to determine the sequence of operations required to process the packets. For example, this may include decryption or other security processing, filtering (i.e. de-multiplexing), extraction of elementary data, and/or error correction, as well as output of the processed packets to a desired destination.

If the encryption is packet based, then unwanted packets will already have been filtered out by the front-end 20 as discussed above. However, if the encryption was block-based, the front-end 20 will have been unable to filter out unwanted packets from within the block and so instead the transport processor 22 may filter out the unwanted packets based on their PID once block-decrypted by the security co-processor 24.

If the encryption is packet based, the sequence of operations will include passing the packet to the security co-processor 24 for security processing such as decryption. Advantageously, the transport processor 22 does this by passing the encrypted packets along with packet based commands to the security co-processor 24 via the TP to SC queue 28—without passing via the data bus 15 or system memory 12. The security co-processor 24 receives the secure, encrypted packets via the queue 28, and executes security code which applies one or more security algorithms to the secure packets to generate corresponding security-processed packets. The packets in their decrypted or otherwise security-cleared form may be referred to as "clear packets" or as containing "clear data" in their payload. A number of suitable encryption and corresponding decryption algorithms will be familiar to a person skilled in the art, e.g. scrambling and descrambling algorithms.

The code executed on the security co-processor 24 then operates it to return the security-processed packets back to the transport processor 22 via the SC to TP queue 29—again without passing via the data bus 15 or system memory 12. The security co-processor 24 may also return status information via the SC to TP queue 29 regarding the status of the security-processed packets. An example of such status information may be an indication of whether a returned packet is one of a set (e.g. where one packet of the set is returned as clear data and others of the set are returned re-encrypted).

If the encryption was block-based but the security co-processor 24 wrote the block-decrypted transport packets back to system memory 12 in individually encrypted form (i.e. packet-based encrypted form), then the above process of transferring packets via queues 28 and 29 for security processing may still be required. However, if the security co-processor 24 wrote the block-decrypted packets back to system memory 12 in clear form, then no further security processing may be required.

The security co-processor 24 may support any of a variety of different encryption and decryption algorithms and chaining modes. This may include decryption of variable length blocks.

Once the clear packets are returned to the transport processor 24, it may execute code to perform further processing operations. For example, it may perform error correction using error correction codes (ECC) in the packets, if present, or handling of transport errors or continuity count errors. Such error techniques will be familiar to a person skilled in the art. E.g. cyclic redundancy checks (CRC) or checksum error checks may be performed, and the transport processor 22 may notify the host driver of any CRC or checksum error via the interrupt line 10.

Further, the transport processor 22 may extract a timestamp value from the packet header and associate this with the packet's arrival time so that clock recovery can be performed. Further, the transport processor 22 may replace specific or unwanted packets by alternative packets.

As another example, if the payloads of packets contain sub-packets in the form of sections, then the transport processor 24 may perform section filtering to remove any unwanted sections from packets with specified PIDs. E.g. such filtering may allow matching of section data may allow matching of section headers against up to 16 bytes where each bit can be individually masked. Other custom filtering functions may also be supported. Further, CRCs or checksums may be performed on section data, and the transport processor may notify the host driver of any CRC or checksum error in an extracted section. Further, the transport processor 22 may notify the host driver of the availability of requested section data in system memory 12.

As yet another example of further packet processing, the transport processor 22 may perform transport packet indexing. This may involve detection and notification of indexing events indicated by various flag settings in the packet headers. It may involve detection and notification of the locations of start codes in the payloads of packets so that indexes can be generated for recorded streams, allowing rapid access and trick modes. Further, it may involve detection and notification of the locations of start codes in the extracted elementary stream outputs to simplify decoder control As another example, if required, the transport processor may also extract the elementary stream data in order to reconstruct the de-multiplexed elementary packets from the transport packets.

Following any such operations, the transport processor completes the transport processing by outputting the processed packets to the required destination. If the output is to be in the form of a partial transport stream, e.g. with the required program or programs having been de-multiplexed into the partial stream, then this outputting comprises writing the packets of the output transport stream to system memory 12, via the bus interface 17*b* and data bus 15. The transport stream generator 26 then retrieves those packets from the system memory 12, via bus interface 17*d* and the data bus 15, multiplexes them into an output transport stream 4, and outputs that stream via the output transport stream connection 5. If on the other hand the output is to be in another form such as an encapsulated stream to a USB or Ethernet output, then the outputting may be by means of a DMA transfer from the transport processor 22 to the peripherals 11. Output transport streams or encapsulated streams could also be written to system memory 12 or an external hard drive 106 for storage. As another alternative, if elementary streams are extracted by the transport processor 22, then these elementary streams can be sent to on-chip decoders for decoding and output to, say, a TV screen and loudspeakers.

Further, if required prior to output, the transport processor 22 could send the clear packets back to the security co-processor 24 for re-encryption via the TP to SC queue 28, and the security co-processor 24 would then execute code to return corresponding re-encrypted packets to the transport processor 22 via the SC to TP queue 29. Alternatively the output could be in decrypted form.

The above embodiments provide an improved transport stream de-multiplexer architecture, which is programmable and flexible whilst at the same time providing performance comparable more hardware based solutions.

Using two different processors, one for transport processing operations and one for security processing operations, is advantageous because it reduces the load on the transport processor. That is, it reduces the perturbation to the transport processing, in terms of processing cost, caused by the requirement for security processing. So from the transport processor's point of view, the security aspects of the system are simply allowed to take care of themselves. Thus the speed of processing is increased, which is desirable when processing real-time streams.

The use of a dedicated, hardware queues 28 and 29 between the transport processor 22 and security processor 24 is particularly advantageous. Firstly, it ensures that packets are not shunted back to system memory 12 unnecessarily, thereby reducing the load on the system memory bandwidth. If the transport processor 22 and security processor 24 had to communicate packets by reading and writing them to system memory 12 via the system data bus 15 then this would put an undesirable load on the system memory 12, and take up an undesirable amount of time in memory access and bus arbitration. By instead providing hardware queues 28 and 29 for packet transfer, the speed of transfer is increased by reducing the load on system memory and the number of memory accesses required.

Secondly, if the packets had to pass through system memory 12 during security operations then this would leave the security of the system open to hacking. However, using the dedicated queues 28 and 29, the system is less vulnerable to hacking since the packets are kept out of general memory during security operations. It allows the security aspects to be handled in isolation from the rest of the system, and ensures a clear distinction in software between secure and non-secure operations.

For example, the use of hardware queues allows clear packet data to be isolated from the rest of the system when that data is only used temporarily, e.g. for packet payload indexing, where the clear data is only used to find start codes for record index creation and is subsequently thrown away.

Further, the above also provides flexibility in the communication mechanism between the processors 22 and 24, which allows firmware defined mechanisms to transfer different types of data between them. For example, there could be a transfer of an encrypted packet in one direction and the return of both a clear packet and a re-encrypted packet in the other. Future firmware revisions could enhance the communication to pass additional data if requirements change.

The above system can be used for example in a satellite, terrestrial or cable television receiver 102. In a preferred embodiment, the system is programmed to support the DVB, DSS and/or DirecTV standards.

Figure 4:
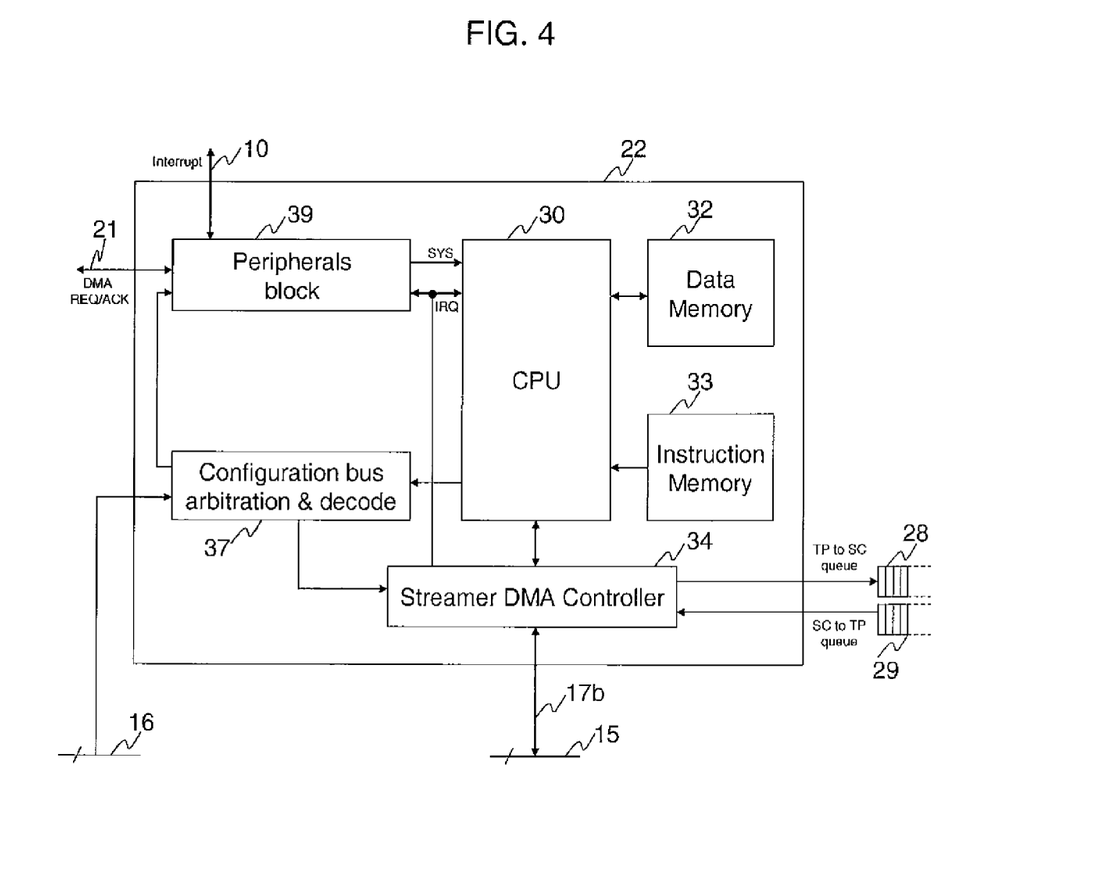
FIG. 4 is a schematic block diagram of a transport processor for use in a transport stream subsystem.

An example architecture of the transport processor 22 is shown schematically in FIG. 4. Here, the transport processor 22 comprises a CPU 30, a data memory 32, an instruction memory 33, a streaming DMA engine 34, a configuration bus arbitration and decode block 37, and a peripherals block 39 comprising a plurality of peripherals.

The data memory 32 and instruction memory 33 are each coupled to the CPU 30 via respective interfaces. The CPU 30 executes code fetched from the instruction memory 33 for performing the transport packet processing described above, and uses the data memory 32 for reading and writing data where required in such processing. The host 9 is also able to access the data memory 30 and instruction memory 33 via the DMA engine 34.

The CPU 30 is interfaced to the data bus 15 and system memory 12 via the DMA engine 34, which offloads the external memory accesses from the CPU 30. The DMA engine 34 also includes interfaces which allow the CPU 30 to send commands and packets to the security co-processor 24 via the TP to SC queue 28, and to receive packets and status information back via the SC to TP queue 29.

To control various aspects of the CPU function like reset, start-up and power-down, the memory-mapped peripherals block 39 is provided (which can control such aspects of the CPU via the signal marked SYS). The peripherals 39 may also include a mailbox function to allow the host 9 to generate an interrupt (IRQ) to the CPU 30 and vice versa via the interrupt line or lines 10. The peripherals 39 may also include some general purpose I/O registers, and a timer and counter function for the CPU 30.

As discussed earlier, the transport processor 22 needs to communicate with the front-end's DMA block via its DMA REQ/ACK interface 21. This is achieved by wiring the DMA request input signals to one of the general purpose input functions inside the peripherals block 39, and the DMA acknowledgement outputs to a general purpose output function.

In order for the host 9 and local CPU 30 to access the peripherals 39 and DMA engine 34, there is provided a configuration bus arbitration and decode block 37, which arbitrates between the host 9, local CPU 30 and the security co-processor's CPU, and then decodes the address for the relevant block.

Figure 5:
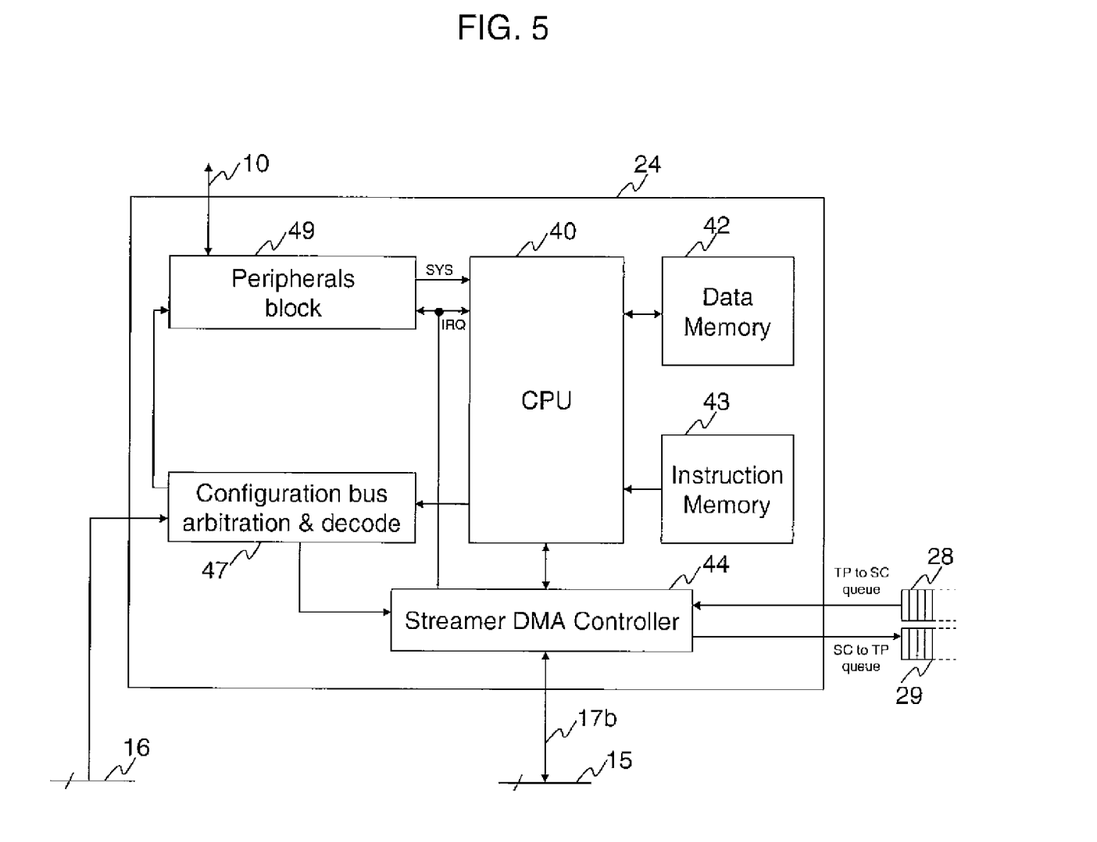
FIG. 5 is a schematic block diagram of a security co-processor for use in a transport stream subsystem.

An example architecture of the security co-processor is shown schematically in FIG. 5. Here, the security co-processor 24 comprises a CPU 40, a data memory 42, an instruction memory 43, a streaming DMA engine 44, a configuration bus arbitration and decode block 47, and a peripherals block 49 comprising a plurality of peripherals.

The data memory 42 and instruction memory 43 are each coupled to the CPU 40 via respective interfaces. The CPU 40 executes code fetched from the instruction memory 43 for performing the security processing described above, and uses the data memory 42 for reading and writing data where required in such processing. For example, security keys may be held in the data memory 42 whilst the instructions making up the security algorithms may be held in the instruction memory 43. The host 9 is also able to access the data memory 40 and instruction memory 43 via the DMA engine 44.

The CPU 40 is interfaced to the data bus 15 and system memory 12 via the DMA engine 44, which offloads the external memory accesses from the CPU 40. The DMA engine 44 also includes interfaces which allow the CPU 40 to receive commands and packets from the transport processor 22 via the TP to SC queue 28, and to return packets and status information back via the SC to TP queue 29.

Again, to control various aspects of the CPU function like reset, start-up and power-down, the memory-mapped peripherals block 49 is provided (which can control such aspects of the CPU 40 via the signal marked SYS). The peripherals 49 may also include a mailbox function to allow the host 9 to generate an interrupt (IRQ) to the CPU 40 and vice versa via the interrupt line or lines 10. The peripherals 49 may also include some general purpose I/O registers, and a timer and counter function for the CPU 40.

Further, in order for the host 9 and local CPU 40 to access the peripherals 49 and DMA engine 44, there is provided a configuration bus arbitration and decode block 47, which arbitrates between the host 9 and local CPUs 30 and 40, and then decodes the address for the relevant block.

The security co-processor 24 may have some additional security features. For example, it may comprise one or more one-time-writeable or many-time-writeable fuse latches on the chip, such as laser fuses, arranged so as to allow one or more of the security processing functions of the co-processor 24 to be selectively enable or disabled. Further, certain address ranges of the security co-processor 24 may be blocked form external access, particularly not being accessible to the host 9 or otherwise via a system-wide bus such as data bus 15. E.g. the regions of the instruction memory 43 containing the security algorithms such as encryption or decryption algorithms or the regions of the data memory 42 containing keys may only be accessible to the local CPU 40 and not generally accessible via the system-wide bus 15.

Figure 6:
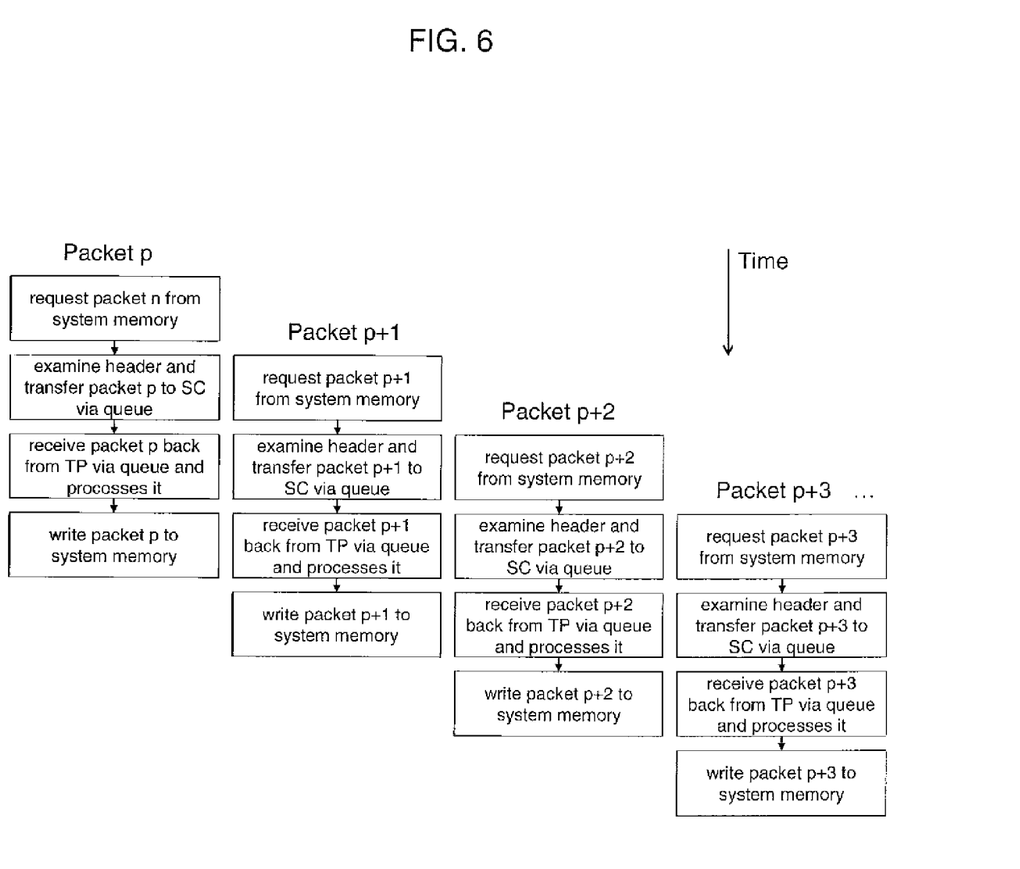
FIG. 6 is a flow chart of a method of operating a transport processor in a transport subsystem.

A preferred method of operating the transport processor is now described in relation to the flow chart of FIG. 6. Particularly, by executing appropriate software on the transport processor's CPU 30, the transport processor 22 is operated to pipeline the transport packet processing so as to maximise parallelism in the packet processing. To represent this pipelining schematically in FIG. 6, time is shown increasing down the page, with steps shown horizontally aligned being performed substantially in parallel, i.e. concurrently.

In a first step of processing a packet p, the transport processor 22 issues a read request for the packet p to be retrieved from the system memory 12 via the data bus 15.

Following that, in a first step of processing a subsequent packet p+1, the transport processor 22 requests the packet p+1 to be retrieved from the system memory 12 via the data bus 15. Substantially in parallel (i.e. concurrently) with the retrieval of packet p+1 from system memory, a second step of processing packet p is performed whereby the transport processor processes the header of the packet p and sends it to the security co-processor 24 via the TP to SC queue 28 for security processing, e.g. decryption or encryption.

Following on again, a first step of processing a next subsequent packet p+2 is performed whereby the transport processor 22 requests the packet p+2 from the system memory 12. Substantially in parallel with the retrieval of packet p+2, a second step of processing packet p+1 is performed whereby the transport processor 22 processes the header of the packet p+1 and sends it to the security co-processor 24 via the TP to SC queue 28 for security processing. Further, substantially in parallel with the retrieval of packet p+1 from system memory 12 and with the security processing of packet p by the security co-processor 24, a third step of processing packet p is performed whereby the packet p is returned from the security co-processor 24 via the SC to TP queue 29 and has its payload processed by the transport processor 22.

Following on again, a first step of processing a next subsequent packet p+3 is performed whereby the transport processor 22 requests the packet p+3 from the system memory 12. Substantially in parallel with the retrieval of packet p+3, a second step of processing packet p+2 is performed whereby the transport processor 22 processes the header of the packet p+2 and sends it to the security co-processor 24 via the TP to SC queue 28 for security processing. Further, substantially in parallel with the retrieval of packet p+3 from system memory 12 and with the security processing of packet p+2 by the security co-processor 24, a fourth step of processing packet p is performed whereby the transport processor 22 issues a write request to write the packet p to system memory 12 once its payload has been processed. Further, substantially in parallel with the retrieval of packet p+3 from system memory 12, with the security processing of packet p+2 by the security co-processor 24, and with the writing of packet p to system memory 12, a third step of processing packet p+1 is performed whereby the packet p is returned from the security co-processor 24 via the to TP queue 29 and has its payload processed by the transport processor 22.

The method may continue in this pipelined fashion, with each next subsequent packet p+4, p+5, etc. being processed one of the four pipelined steps on in time from the previous packet. Thus up to four packets may be being processed at any one time, each at a different one of the four described pipeline stages.

This technique maximises parallelism in the packet processing, taking full advantage of delays in, for example, accessing packets from system memory 12, or the delay associated with packet decryption in the security co-processor 24. By de-coupling the packet processing tasks from the data movement in the system, maximum use is made of the available processor cycles.

Note that the parallel, concurrent processing is not (or at least need not) be though parallel execution units. Instead, it is achieved by scheduling the different concurrent tasks through a single execution unit so as to take advantage of the inherent delays in each of the steps to execute another of the steps. That is, by using the time spent waiting for a memory access, or the time spent waiting for a packet to be security processed, to execute another processing stage of another packet.

For example, there will be a delay between the transport processor 22 issuing a read request for a packet and that packet being returned from system memory 12. So whilst the transport processor 22 is waiting for packet p+3 to be returned from memory, it may use this otherwise "dead" time to process the header of packet p+2 and transfer it to the security co-processor 24 for security processing. This security processing will also involve a delay, so whilst the transport processor 22 is waiting for packet p+3 to be retrieved from memory and waiting for packet p+2 to be returned from the security processor 24, it may use this time to issue a write request for packet p to be written to system memory 12. This write will also involve a delay, so whilst the transport processor 22 is waiting for packet p+3 to be retrieved from memory, waiting for packet p+2 to be returned from the security processor 24, and waiting for the writing of packet p to system memory 12 to be complete, it may use this time to perform payload processing on packet p+1.

Note also that this pipelining technique can have an application to any system having a packet processing processor and a separate security processor. Although it has been found to be particularly efficient in the case where the two processors are connected by hardware queues, the described pipelining technique may also be used in a case where the two processors exchange packets by other means, for example via a system memory or DMA engine.

Further, nor is it essential that each of the above-describe steps are exactly aligned in time: the important point is that at least some "dead" time in waiting for an operation on one packet to complete is used to begin another operation on another packet.

It will be appreciated that the above embodiments are described only by way of example. In other embodiments for instance, the connection of one processor to another for security purposes via hardware queues could have an application to other types of streams than transport streams. Further, although in the above the queues 28 and 29 have been described as first-in, first-out queues, in alternative embodiments a different queuing protocol could be implemented such as priority queuing. Further, although the above security co-processor has been described as performing all required security operations, in other embodiments it could output only partially security-processed packets, leaving some other part of the security processing for example for the transport processor, output apparatus or some other component. Other applications and configurations may be apparent to the person skilled in the art given the disclosure herein. The scope of the invention is not limited by the described embodiments, but only by the following claims.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for processing packet streams, the system comprising:
    a system data-bus configured to transfer packets of data;
    a system memory connected to the system data-bus for storing packets;
    a first processor connected to the system data-bus; and
    a second processor connected to the system data-bus,
    the first processor is programmed to control security processing of secure packets retrieved by the second processor,
    the second processor is configured to perform security processing by applying one or more security algorithms to the retrieved secure packets to generate corresponding security-processed packets,
    the first processor is further configured to process the security-processed packet to generate a secure data output, and enable the second processor to perform concurrent operations, including:
    (i) retrieving a secure packet from the system memory via the system data-bus, the retrieving involving a delay while a read completes during which the first processor is unoccupied in the retrieving and begins another operation;
    (ii) security processing of a previously retrieved packet by the second processor, the security processing involving a delay while the first processor awaits return of a security-processed packet from the second processor and during which the first processor begins another operation;
    (iii) processing a previously security-processed packet by the first processor to generate a data output; and
    (iv) writing previously generated output data to the system memory via the system data-bus, the writing involving a delay while the write completes during which the first processor is unoccupied in the writing and begins another operation.

2. The system of claim 1, wherein retrieval by the first processor of a secure packet from the system memory via the data bus involves a retrieval delay while a read completes and wherein the security processing and further processing of another secure packet are performed during the retrieval delay.

3. The system of claim 1, wherein the first processor is programmed to control writing of previously generated output data to the system memory via the data bus, wherein the writing involves a write delay while the write completes, and wherein the security processing and further processing of a secure packet are performed during the write delay.

4. The system of claim 1, wherein each packet comprises a header and a payload, and wherein the security processing comprises decrypting the payload of the packet.

5. The system of claim 4, wherein the further processing comprises operating on a decrypted payload of the packet.

6. The system of claim 5, wherein a front-end circuit is connected to the data bus is configured to receive an input stream and to write secure packets of the stream to the system memory via the data bus.

7. The system of claim 6, wherein the input stream is an input transport stream comprising secure packets of a plurality of multiplexed streams, each packet comprising a header and a payload, and wherein the front-end circuitry comprises filtering circuitry configured to read the headers to select only the secure packets of one or more desired multiplexed streams to write to the system memory.

8. The system of claim 6, wherein the input stream is an input transport streams comprising secure packets of a plurality of multiplexed streams and each packet comprising a header and a payload, and wherein the first processor is programmed to read the headers to select only secure packets of one or more desired multiplexed streams for the security processing and the further processing.

9. The system of claim 6, wherein the input stream is an input transport stream comprising secure packets of a plurality of multiplexed streams, wherein the first processor is configured to generate the output data as output packets for output to a user output apparatus and to write the output packets to the system memory via the data-bus, and wherein the system further comprises:
    transport stream generation circuitry configured to retrieve the output packets from the system memory via the system data-bus, to arrange the retrieved output packets into an output transport stream comprising secure packets of a plurality of multiplexed streams, and to output the output transport stream to the user output apparatus as an output stream.

10. The system of claim 6, wherein each packet comprises a header and a payload, and both the headers and the payloads of a plurality of the packets are encrypted together in an encrypted block, wherein the front-end circuitry is configured to receive and write the encrypted block to the system memory, and wherein the second processor is configured to retrieve the encrypted block and to perform a perform a block-based decryption to extract the packets of the encrypted block, then write the extracted packets back to the system memory prior to the retrieval by the first processor.

11. The system of claim 10, wherein some address ranges of the second processor are blocked from external access.

12. The system of claim 5, wherein each packet comprises a header and a payload and the payload of one or more of the packets comprises a plurality of sub-packets, and wherein the further processing by the first processor on the decrypted payloads comprises filtering out unwanted sub-packets.

13. The system of claim 5, wherein the further processing by the first processor on one or more of the decrypted payloads comprises using the payload to index the packet.

14. The system of claim 13, wherein the first processor is configured to discard the decrypted payload of the indexed packet after indexing.

15. The system of claim 1, wherein each packet comprises a header and a payload, and wherein the first processor is configured to assess one or more headers of the secure packets to determine a sequence of operations to be performed before subsequently transferring the secure packets to the second processor for security processing.

16. The system of claim 1, wherein the input stream comprises at least one of an audio and video stream, and the further processing comprises obtaining elementary packets from the security-processed packets for decoding of audio or video content by the user output apparatus.

17. The system of claim 16, wherein the audio or video input stream comprises packets encoded according to one of: a satellite television format, a terrestrial television format, a cable television format, and internet protocol.

18. A method of processing packet streams, the method comprising:
retrieving secure packets from a system memory via a data bus by a first processor connected to a second processor and to the system memory via the data-bus;
controlling, at the first processor, security processing of the retrieved secure packets by the second processor;
applying one or more security algorithms to the retrieved secure packets by the second processor to generate corresponding security-processed packets at the second processor;
while the first processor returns a security-processed packet from the second processor, further processing a previously security-processed packet at the first processor to generate a secure data output;
executing code on the first processor, and enabling the second processor to perform concurrent operations, including:
(i) retrieving a secure packet from the system memory via the system data-bus, the retrieving involving a delay while a read completes during which the first processor is unoccupied in the retrieving and begins another operation;
(ii) security processing of a previously retrieved packet by the second processor, the security processing involving a delay while the first processor awaits return of a security-processed packet from the second processor and during which the first processor begins another operation;
(iii) processing a previously security-processed packet by the first processor to generate a corresponding secure data output; and
(iv) writing previously generated output data to the system memory via the system data-bus, the writing involving a delay while the write completes in during which the first processor is unoccupied in the writing and begins another operation.

19. The method of claim 18, wherein retrieval of a secure packet by the first processor from the system memory via the data bus involves a retrieval delay while a read completes and wherein the security processing and further processing of another secure packet are performed during the retrieval delay.

20. The method of claim 18, wherein the first processor is programmed to control writing of previously generated output data to the system memory via the data bus, wherein the writing involves a write delay while the write completes, and wherein the security processing and further processing of a secure packet are performed during the write delay.

21. The method of claim 18, wherein each packet comprises a header and a payload, and wherein the security processing comprises decrypting the payload of the packet.

22. The method of claim 21, wherein the further processing comprises operating on a decrypted payload of the packet.

23. The method of claim 22, wherein front-end circuitry connected to the data bus is configured to receive an input stream and to write secure packets of the stream to the system memory via the data bus.

24. The method of claim 23, wherein the input stream is an input transport stream comprising secure packets of a plurality of multiplexed streams, each packet comprising a header and a payload, and a front-end circuit comprises filtering circuitry configured to read the headers to select only the secure packets of one or more desired multiplexed streams to write to the system memory.

25. The method claim 23, wherein the input stream is an input transport streams comprising secure packets of a plurality of multiplexed streams and each packet comprises a header and a payload, and wherein the first processor is programmed to read the headers to select only secure packets of one or more desired multiplexed streams for the security processing and the further processing.

26. The method of claim 23, wherein each packet comprises a header and a payload, and both the headers and the payloads of a plurality of the packets are encrypted together into an encrypted block, wherein the front-end circuitry is configured to receive and write the encrypted block to the system memory, and wherein the second processor is configured to retrieve the encrypted block and to perform a block-based decryption to extract the packets of the encrypted block, then write the extracted packets back to the system memory prior to the retrieval by the first processor.

27. The method of claim 26, comprising blocking some address ranges of the second processor from external access.

28. The method of claim 22, wherein each packet comprises a header and a payload and the payload of one or more of the packets comprises a plurality of sub-packets, and wherein the further processing by the first processor on the decrypted payloads comprises filtering out unwanted sub-packets.

29. The method of claim 22, wherein the further processing by the first processor on one or more of the decrypted payloads comprises using the payload to index the packet.

30. The method of claim 29, wherein the first processor is configured to discard the decrypted payload of the indexed packet after indexing.

31. The method of claim 20, wherein the input stream is an input transport stream comprising secure packets of a plurality of multiplexed streams, wherein the first processor is configured to generate the output data as output packets for output to a user output apparatus and to write the output packets to the system memory via the data-bus, and wherein transport stream generation circuitry is configured to retrieve the output packets from the system memory via the data-bus, to arrange the retrieved output packets into an output transport stream comprising secure packets of a plurality of multiplexed streams, and to output the output transport stream to the user apparatus as an output stream.

32. The method of claim 20, wherein each packet comprises a header and a payload, and wherein the first processor is configured to assess one or more headers of the secure packets to determine a sequence of operations to be performed before subsequently transferring the secure packets to the second processor for security processing.

33. The method of claim 18, wherein the input stream comprises at least one of an audio and video stream, and wherein the further processing comprises obtaining elementary packets from the security-processed packets for decoding of audio or video content by the user output apparatus.

34. The method of claim 33, wherein the audio or video input stream comprises packets encoded according to one of: a satellite television format, a terrestrial television format, a cable television format, and Internet protocol.

35. A set-top box for processing packet streams, the box comprising:
   an input configured to receive packets of data;
   a system data-bus configured to transfer the packets of data;
   a system memory connected to the system data-bus and configured to store packets;
   a first processor connected to the system data-bus and configured to retrieve secure packets from the system memory via the system data bus; and
   a second processor connected to the system data-bus,
   the first processor is programmed to control security processing of the retrieved secure packets by the second processor,
   the second processor is configured to perform security processing by applying one or more security algorithms to the retrieved secure packets to generate corresponding security-processed packets,
   the security processing of each retrieved secure packet involves a security processing delay, and
   the first processor is further configured to process the security-processed packet to generate corresponding secure data output, and enable the second processor to perform concurrent operations, including:
   (i) retrieving a secure packet from the system memory via the system data-bus, the retrieving involving a delay while a read completes during which the first processor is unoccupied in the retrieving and begins another operation;
   (ii) security processing of a previously retrieved packet by the second processor, the security processing involving a delay while the first processor awaits return of a security-processed packet from the second processor and during which the first processor begins another operation;
   (iii) processing a previously security-processed packet by the first processor to generate a data output; and
   (iv) writing previously generated output data to the system memory via the system data-bus, the writing involving a delay while the write completes during which the first processor is unoccupied in the writing and begins another operation.

36. A television for processing packet streams, the television comprising:
   a display configured to display video corresponding to packets of data;
   a system data-bus configured to transfer the packets of data;
   a system memory connected to the data-bus and configured to store packets;
   a first processor connected to the system data-bus and configured to retrieve secure packets from the system memory via the system data bus; and
   a second processor connected to the data-bus,
   the first processor is programmed to control security processing of the retrieved secure packets by the second processor,
   the second processor is configured to perform security processing by applying one or more security algorithms to retrieved secure packets to generate corresponding security-processed packets,
   the security processing of each retrieved secure packet involves a security processing delay, and
   the first processor is further configured to process the security-processed packet to generate a secure data output, and enable the second processor to perform concurrent operations, including:
   (i) retrieving a secure packet from the system memory via the system data-bus, the retrieving involving a delay while a read completes during which the first processor is unoccupied in the retrieving and begins another operation;
   (ii) security processing of a previously retrieved packet by the second processor, the security processing involving a delay while the first processor awaits return of a security-processed packet from the second processor and during which the first processor begins another operation;
   (iii) processing a previously security-processed packet by the first processor to generate a data output; and
   (iv) writing previously generated output data to the system memory via the system data-bus, the writing involving a delay while the write completes during which the first processor is unoccupied in the writing and begins another operation.

37. A television tuner and demodulator device for processing packet streams, the device comprising:
   a receiver configured to receive signals corresponding to packets of data;
   a system data-bus configured to transfer the packets of data;
   a system memory connected to the system data-bus and configured to store packets;
   a first processor connected to the system data-bus and configured to retrieve secure packets from the system memory via the system data bus; and
   a second processor connected to the data-bus,
   the first processor is programmed to control security processing of the retrieved secure packets by the second processor,
   the second processor is configured to perform security processing by applying one or more security algorithms to retrieved secure packets to generate corresponding security-processed packets,
   the security processing of each retrieved secure packet involves a security processing delay, and
   the first processor is further configured to process the security-processed packet to generate a secure data output, and enable the second processor to perform concurrent operations, including:
   (i) retrieving a secure packet from the system memory via the system data-bus, the retrieving involving a delay while a read completes during which the first processor is unoccupied in the retrieving and begins another operation;
   (ii) security processing of a previously retrieved packet by the second processor, the security processing involving a delay while the first processor awaits return of a security-processed packet from the second processor and during which the first processor begins another operation;

(iii) processing a previously security-processed packet by the first processor to generate a data output; and
(iv) writing previously generated output data to the system memory via the system data-bus, the writing involving a delay while the write completes during which the first processor is unoccupied in the writing and begins another operation.

\* \* \* \* \*

UNITED STATES PATENT AND TRADEMARK OFFICE
CERTIFICATE OF CORRECTION

| | | |
|---|---|---|
| PATENT NO. | : 9,026,790 B2 | Page 1 of 1 |
| APPLICATION NO. | : 12/650215 | |
| DATED | : May 5, 2015 | |
| INVENTOR(S) | : Bolton et al. | |

It is certified that error appears in the above-identified patent and that said Letters Patent is hereby corrected as shown below:

In the Claims

| | |
|---|---|
| Column 16, Line 19 | Delete: "circuit is"<br>Insert: --circuit-- |
| Column 16, Line 31 | Delete: "streams"<br>Insert: --stream-- |
| Column 16, Line 57 | Delete: "to perform a perform"<br>Insert: --to perform-- |
| Column 17, Line 36 | Delete: "output;"<br>Insert: --output; and-- |
| Column 18, Line 21 | Delete: "method claim"<br>Insert: --method of claim-- |
| Column 18, Line 22 | Delete: "streams"<br>Insert: --stream-- |

Signed and Sealed this
Twenty-ninth Day of September, 2015

Michelle K. Lee
*Director of the United States Patent and Trademark Office*